United States Patent
Latschbacher

(10) Patent No.: US 6,520,223 B1
(45) Date of Patent: Feb. 18, 2003

(54) INDICIA CARRYING ELEMENT FOR MARKING TIMBER AND MORE PARTICULARLY LOGS

(75) Inventor: Klaus Latschbacher, Kronstorf (AT)

(73) Assignee: Latschbacher GmbH, Kronstorf (AT)

( * ) Notice: Subject to any disclaimer, the term of this patent is extended or adjusted under 35 U.S.C. 154(b) by 0 days.

(21) Appl. No.: 09/991,904

(22) Filed: Nov. 26, 2001

(30) Foreign Application Priority Data

Aug. 14, 2001 (EP) .............................................. 01119493

(51) Int. Cl.[7] .................................................. B27K 5/00
(52) U.S. Cl. ........................ 144/4.8; 101/368; 101/379; 101/405; 144/2.1; 144/329
(58) Field of Search .......................... 144/2.1, 4.8, 329; 101/368, 379, 403, 19, 28, 385; 283/67

(56) References Cited

U.S. PATENT DOCUMENTS 3,403,623 A * 10/1968 Blackwood ................. 101/368
4,187,772 A * 2/1980 Hollenbeck ................. 101/379
4,278,024 A * 7/1981 Pennington ................. 101/405

FOREIGN PATENT DOCUMENTS

| EP | 0 248 928 A | 12/1987 |
| FR | 2 673 026 A | 8/1992 |
| GB | 2 075 464 A | 11/1981 |

* cited by examiner

Primary Examiner—W. Donald Bray
(74) Attorney, Agent, or Firm—Browdy and Neimark

(57) ABSTRACT

A indicia carrying element for marking timber and more especially logs possessing a indicia carrying body bearing such indicia and having on one side thereof clips for attachment to the head of an applicator hammer in peripheral grooves therein for prior to driving said element into timber, whereas the other side of the element is provided with spurs to be driven into the timber. The clips are arranged in spring regions like lugs in the plate-like indicia carrying body, and such regions are for instance defined by slots in the indicia carrying body. This means that such indicia carrying elements may be reliably clipped onto the standard head of an applicator hammer without there being any danger of the clips breaking off.

9 Claims, 2 Drawing Sheets

INDICIA CARRYING ELEMENT FOR MARKING TIMBER AND MORE PARTICULARLY LOGS

BACKGROUND OF THE INVENTION

The invention relates to an indicia carrying element for marking timber and more particularly logs, comprising a tag-like body bearing indicia and from whose one side heel-like clips project for fitting into peripheral recesses in the head of an applicator hammer for attaching the indicia carrying element to timber and whose other side is provided with anchoring spurs to be thrust into the timber.

THE PRIOR ART

Such an indicia carrying element, which is normally manufactured of synthetic resin, is disclosed in the British patent publication 2,075,464 A. This prior art indicia carrying element, which reassembles the indicia carrying element illustrated in FIGS. 1 through 3 accompanying the present specification, possesses a rectangular plate-like indicia carrying element, whose four catches or clips for clipping to an applicator hammer stand up from the four corner parts. These projecting clips possess detent projections, directed toward each other, in the upper free terminal region and these detent projections fit into a peripheral groove in the hammer head for temporary attachment to it. During attachment to the hammer head such clips are splayed outward elastically until the projections snap into position. Such applicator hammers are for instance marketed by the assignee under the designations 3-027 or 3-010.

In practice different synthetic resin materials are employed for the indicia carrying elements, as for example polyamide (PA) for soft timber, polycarbonate (PC) for hard timber, and polyacetal (POM) for pulp timber so that the indicia carrying element may be digested or dissolved during paper manufacture. In a manner dependent on the respectively utilized type of synthetic resin there is a more or less pronounced shrinkage during production so that finished indicia carrying elements in the form of injection moldings will possess different dimensions. This in turn leads to a situation in which indicia carrying elements with a high degree of shrinkage can only be clipped on the hammer head using substantial force, this entailing a considerable danger of loss of the clips due to a notch-type fracture of same. One known design for dealing with this problem is the use of hammer heads of different respective sizes for different sizes of indicia carrying elements. For instance, the applicator hammer marketed by the assignee as article no. 3-027 is supplied with two different sizes of heads for different sizes of indicia carrying elements. This system is however complicated, more especially if a large range of different hammer heads is necessary for different element sizes. The other possibility, that is to say using a separate injection mold for each type of synthetic resin employed for the indicia carrying elements also leads to substantial expense in manufacture.

SHORT SUMMARY OF THE INVENTION

One object of the invention is to create a indicia carrying element, which despite having dimensions departing from a standard size owing to properties of its material and its manufacture may be readily clipped on a standard head of an applicator hammer without danger of breakage.

In order to achieve these and/or other objects appearing from the present specification, claims and drawings, in the present invention the clips are placed on regions of the, plate-like indicia carrying element, which are in the form of resilient lugs.

In the case of the indicia carrying element of the invention the deformation is distributed between the clips and the spring lug regions. This means that the notch fracture effect at the foot of each of the clips is substantially reduced and this in itself substantially prevents any danger of fracture.

Owing to the elasticity of the spring lug regions the clips may be bent more readily in an outward direction so that even indicia carrying elements, which are really too small, may still be clipped easily that they can be readily taken with the hammer head from a magazine and then be driven into the respective timber.

The features recited in the dependent claims represent advantageous further developments of the indicia carrying element as defined in claim 1.

The clips are preferably arranged at the four corner regions of the rectangular indicia carrying element, that is to say, their position does not have to be different to that of a standard indicia carrying element.

In the unstressed state the spring lug regions are arranged substantially at a right angle to the perpendicularly standing clips, such right angle being substantially maintained when the hammer head is inserted owing to the elasticity of the spring lug regions—unlike the case of conventional indicia carrying element, in the case of which such angle is considerably changed so that stresses occur which produce notch stresses.

In keeping with a preferred form of the invention the spring lug regions are respectively formed by there being at least one slot extending inward from the edge region of the indicia carrying element. This involves the advantage that injection molds only have to be modified to a slight degree and the overall configuration of the indicia carrying elements remains unchanged. It has been found to be particularly convenient to have a design in which each spring lug region is delimited by a slot extending in parallelism to or obliquely at a distance from the long side of the indicia carrying element, such slot having its starting point at one end of the element. The length of the slot can then be selected in accordance with the desired elasticity or flexibility in the spring lug regions formed.

Such indicia carrying bodies are preferably made integrally with the clips and/or the spring lug regions having the clips.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
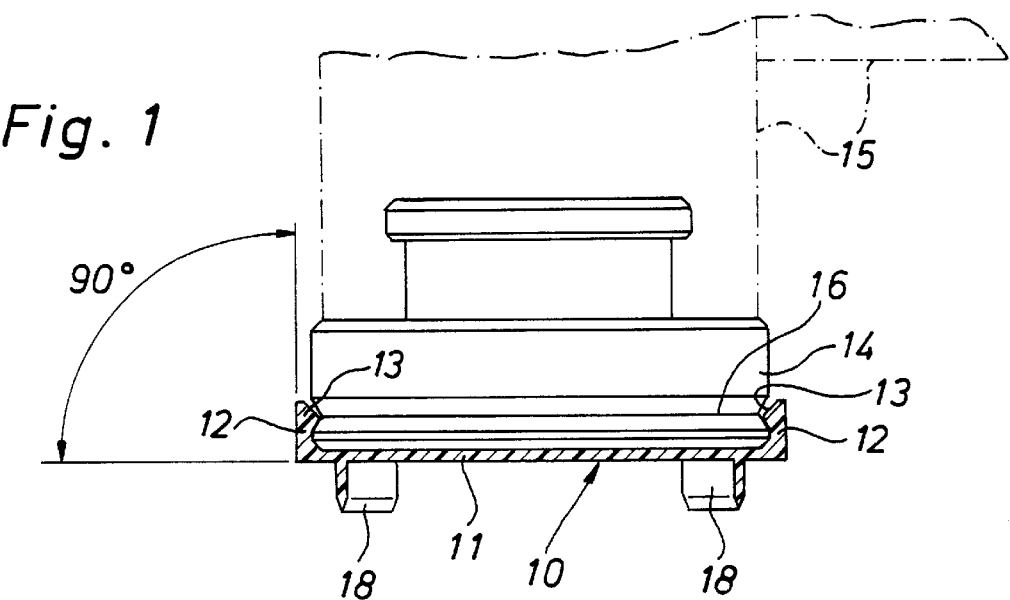
FIG. 1 shows a prior art indicia carrying element clipped on a suitable hammer head in a vertical section.
Figure 2:
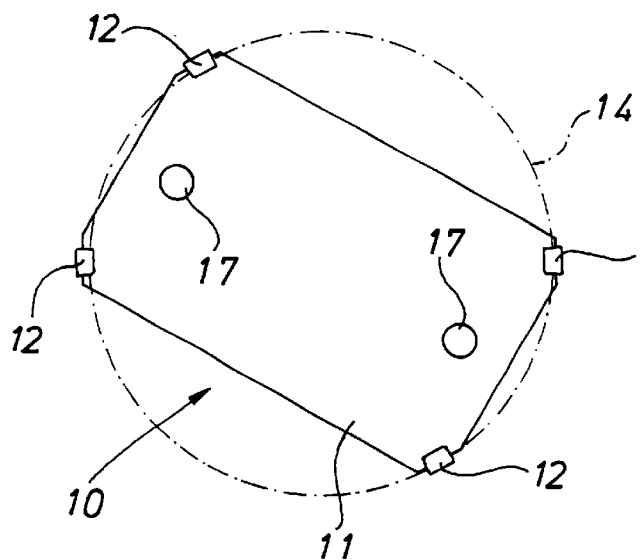
FIG. 2 is a plan view of such indicia carrying element, the hammer head being indicated in chained lines.
Figure 3:
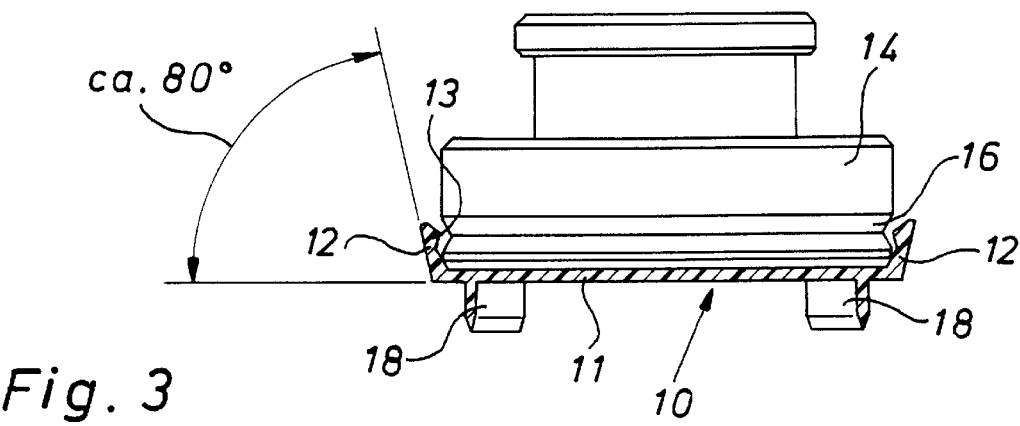
FIG. 3 shows a further known indicia carrying element which however has undergone shrinkage during manufacture and which is slipped on the same hammer head, all in a view similar to that of FIG. 1.

The conventional indicia carrying element or tag represented in FIGS. 1 through 3 is an integral synthetic resin injection molding and its principal part is a rectangular, tabular or plate-like indicia carrying body 11, which at its four chamfered corner regions is provided with clips which are usually termed attachment clips. At their free end parts such attachment clips 12 have catch projections 13 directed toward each other, that is to say toward the middle of the indicia carrying element. On clipping the indicia carrying element on a hammer head 14 such catch projections fit into a peripheral groove 16 in the head 12 of an applicator hammer 15, which is only depicted diagrammatically in chained lines, when the indicia carrying element is clipped to such hammer and become attached to the hammer with a detent effect. The catch projections 13 and the cross section of the corresponding peripheral groove 16 are wedge-like or triangular, but have some other suitable catch configuration.

Two through holes 17 in each indicia carrying body 11 render it possible for two bars of a magazine (not illustrated) to be threaded through the indicia carrying elements 10. Such magazines, indicia carrying elements and applicator hammers are described in sales literature of the assignee.

On the side, which faces away from the clips 12, two anchoring spurs 18 are integrally formed, which may be a hammered into a piece of timber. As described in the initially mentioned prior art such spurs may be corrugated or flat in structure and taper toward their outer ends as cutting edges to facilitate driving them into the timber which is to be marked. There are indicia on the side opposite to the side spurs 18 of the indicia carrying body 11 but they are omitted in order render the drawing more straightforward. Such indicia may be in the form of an embossed, molded or printed sequence of numbers or letters or a optical, magnetic or electromagnetic code or of a for instance adhesively attached label.

Such indicia carrying elements 10 are retrieved from the magazine by the hammer head 14 by firstly moving the hammer 15 so that its head 14 is thrust against the top indicia carrying element so that the clips 12 are splayed apart and eventually clip into the peripheral groove 16. Now the indicia carrying element 10 is struck against the timber to be marked by a blow of the hammer, the spurs 18 being thrust into the timber. On retracting the applicator hammer 15 the hammer head 14 is freed from the clips 12 by splaying them apart.

FIG. 1 shows a indicia carrying element 10, which as regards its dimensions is exactly adapted to the hammer head 14, the upstanding clips 12 are at an angle of 90 degrees to the plane of the indicia carrying body 11 in the clipped on or unstressed position (as illustrated in FIG. 1).

Figure 4:
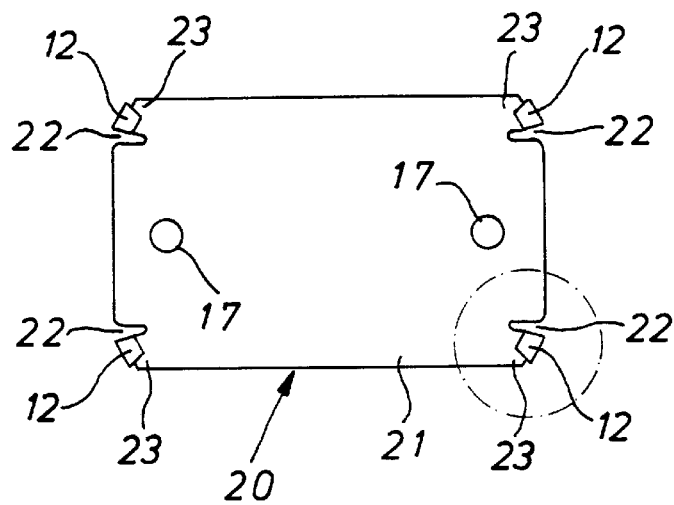
FIG. 4 is a plan view of a indicia carrying element as a working example of the invention.
Figure 5:
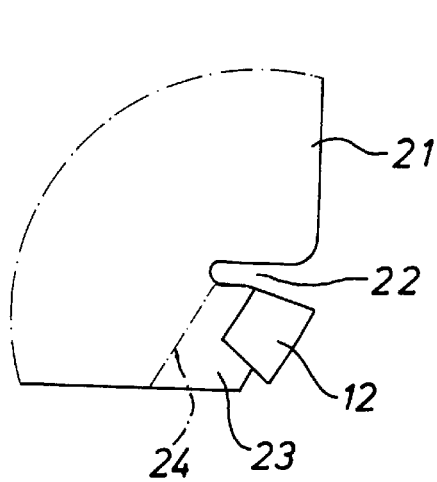
FIG. 5 is detailed view of a corner region of the indicia carrying element depicted in FIG. 4.
Figure 6:
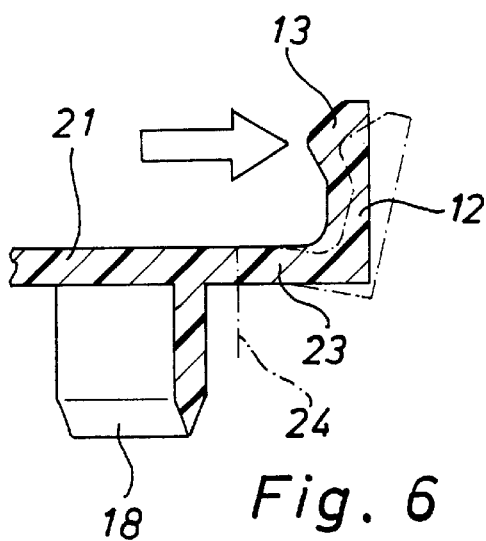
FIG. 6 is a vertical representation of such a corner region.
Figure 7:
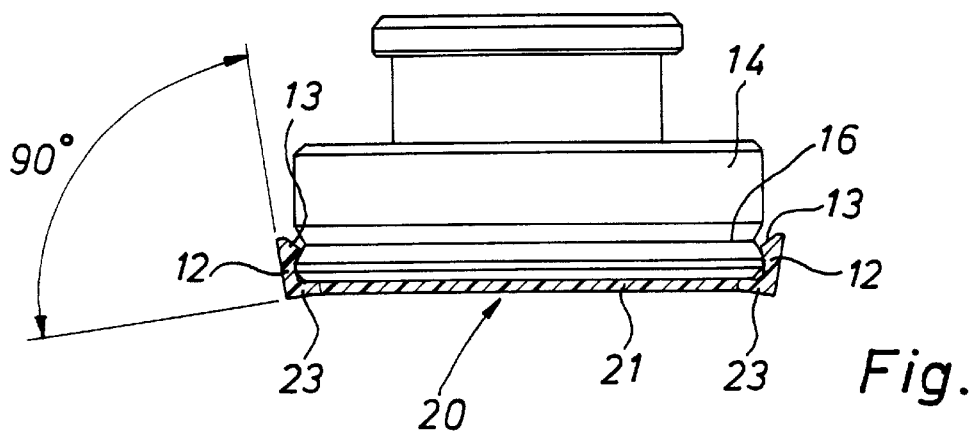
FIG. 7 shows the indicia carrying element clipped on a hammer head in an arrangement similar to that of FIGS. 1 and 3.

Dependent on the type of timber different synthetic resin materials are utilized for the production of the indicia carrying elements 10, as for instance polyamide (PA) for soft timber, polycarbonate (PC) for hard timber, and polyacetal (POM) for pulp timber. In the case of the last application the indicia carrying element must be able to be digested or dissolved during paper manufacture. However, the different types of synthetic resin undergo a different degree of shrinkage during working and the finished indicia carrying elements as moldings possess mutually different dimensions and for instance polyacetal shrinks by approximately 2.3%. In the case of the utilization of the same hammer head 14 the situation will be as illustrated in FIG. 4, that is to say the clips 12 must be splayed substantially further outward on fitting on the hammer head 14 and consequently in the snapped-on condition will still be at an angle differing from 90 degree, for instance 80 degrees. The result of this is that substantially more force must be exerted for clipping on and furthermore the clips 12 are liable to notch fracture owing to the stresses then occurring. Consequently they may drop off the hammer head 14 so that it is no longer possible to anchor the indicia carrying element on a log. Furthermore fracture in the clips may endanger an operator. The proper removal of such indicia carrying elements 10 from a magazine is then hardly possible in the described manner.

The indicia carrying element 20 illustrated in FIGS. 4 through 7 as an embodiment of the invention is in some respects identical to the indicia carrying element 10 so that like structural elements are denoted by the same reference numerals and are not described over again. In contradistinction to the indicia carrying element 10 the indicia carrying body 21 has a slot 22 extending in each corner zone from the respective clip 12 at the narrow end sides and running approximately parallel to the long sides. This means that flexible regions 23 like spring lugs are formed, whose outer ends bear the clips 12. In the unstressed state the regions 23 like spring lugs lie in the plane of the indicia carrying body 21, from which they are shaped and with the clips they constitute an L-like arrangement. On clipping onto the hammer head 14 such L-like arrangement is bent essentially about the line 24 of flexure depicted in FIGS. 5 and 6 in an outward direction, such line extending in the transitional zone between the spring region 23 and the remaining region of the indicia carrying body 21. This means that the bending load and accordingly the fracturing effect is substantially kept clear of the foot of the clips 12 on the indicia carrying body 21 and is shifted toward the line 24 of flexure so that now the region 23 in the form of a spring lug is subject to continuous deformation. Even in the case of "undersized" indicia carrying elements 20 in accordance wit FIG. 7, there will still be an angle of essentially 90 degrees between the clips 12 and the spring regions 23. Adjacent to the lines of flexure in the spring regions 23 there will be substantially smaller bend stresses than in conventional indicia carrying elements 10.

The slots 22 illustrated in the figures of the embodiment extend essentially in parallelism to the long sides of the indicia carrying element 21. In principle same may also extend obliquely so that the width of the spring regions 23 is made smaller or larger along the length thereof. The slots 22 may be produced with a taper in order to optimize the bend line.

In further embodiments of the invention, not illustrated, two slots may delimit each respective spring region 23. These slots 22 then run toward the middle of the indicia carrying body 21 for instance. In other respects round, square or other suitable configurations of indicia carrying bodies are possible. The invention is not limited to the disclosed forms and may be applied to all known modifications of indicia carrying elements, as for example the indicia carrying elements indicated in the initially mentioned prior art. The essential point is that the spring regions defined by one or two slots are of such a width and length that owing to the deformability of the elements same may be made with different sizes and may be readily clipped on a hammer head 14.

A further embodiment of the invention, not illustrated, may be such that the spring regions are formed on the peripheral line of indicia carrying bodies. For instance, in the case of round indicia carrying bodies three regions will be sufficient.

What is claimed is:

1. An indicia carrying element for marking timber and more particularly logs, comprising a tag-like body bearing indicia and from whose one side heel-like clips project for fitting into peripheral recesses in the head of an applicator hammer for attaching the indicia carrying element to timber and whose other side is provided with anchoring spurs to be thrust into the timber, wherein the clips are placed on regions of the plate-like indicia carrying element, which are in the form of resilient lugs.

2. The indicia carrying element as set forth in claim 1, wherein said clips are arranged on the four corner regions of the rectangular indicia carrying body.

3. The indicia carrying element as set forth in claim 1, wherein the spring regions are arranged essentially at a right angle to the upstanding clips.

4. The indicia carrying element as set forth in claim 1, wherein with the remaining regions of the indicia carrying element the spring regions constitute a single plane in the unstressed state of the element.

5. The indicia carrying element as set forth in claim 1, wherein the spring regions are respectively delimited by at least one slot extending from an edge region of the indicia carrying body.

6. The indicia carrying element as set forth in claim 5, wherein each spring region is delimited by a slot extending parallel to or spaced obliquely from the long side of the indicia carrying body, which slot extends from an end side of the indicia carrying body.

7. The indicia carrying element as set forth in claim 1, wherein the spring regions are formed integrally on the peripheral line of the indicia carrying body on same.

8. The indicia carrying element as set forth in claim 1, wherein the indicia carrying body is formed integrally together with regions provided with such spurs and/or the clips.

9. The indicia carrying element as set forth in claim 1, manufactured of a synthetic resin and more particularly a synthetic resin selected from the group essentially comprising polyamide (PA), polycarbonate (PC), and polyacetal (POM).

\* \* \* \* \*